Oct. 31, 1933.  J. A. JENSEN  1,932,972
VALVE OPERATING MECHANISM FOR TANK VEHICLES
Filed April 12, 1933   5 Sheets-Sheet 3
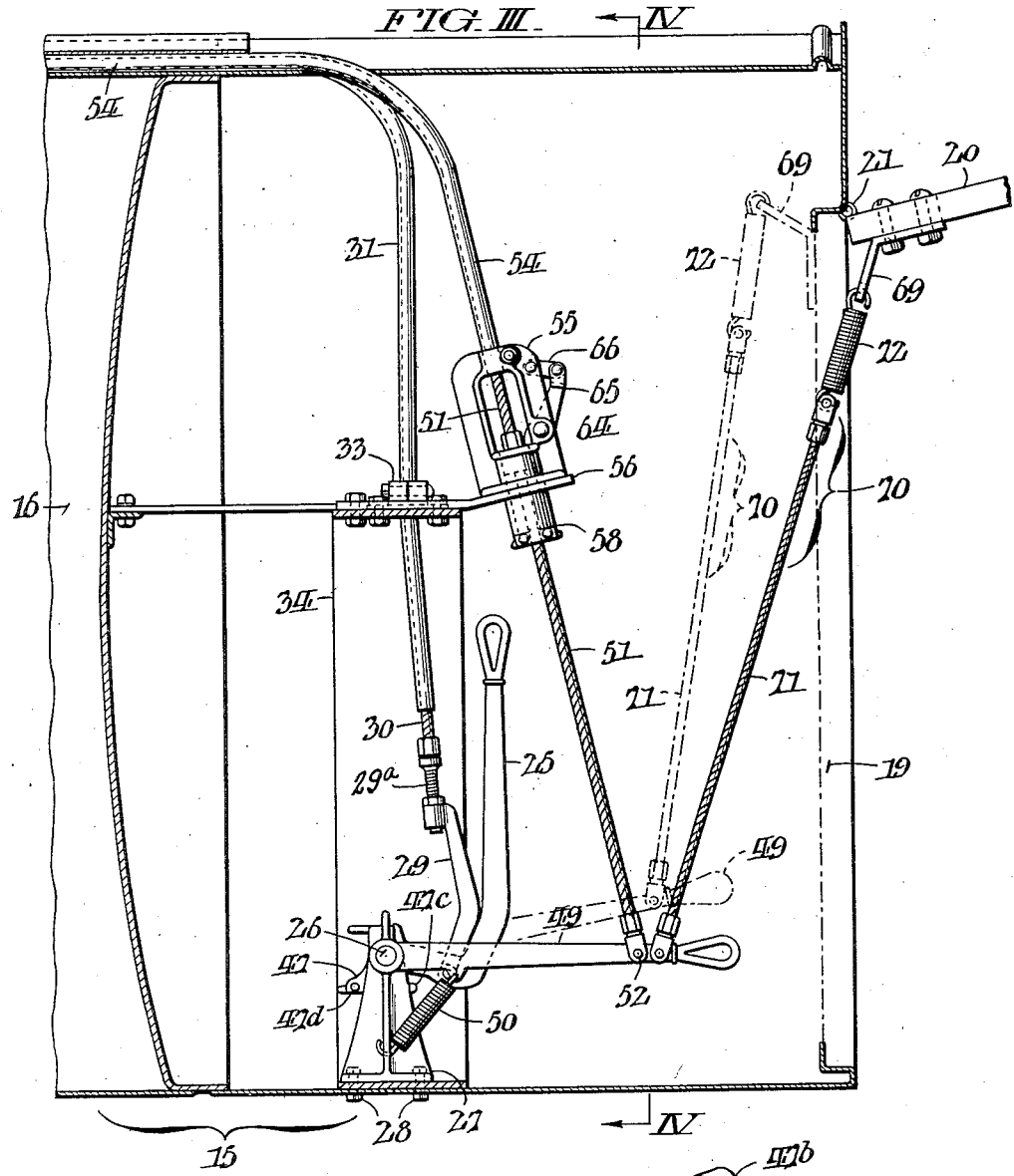
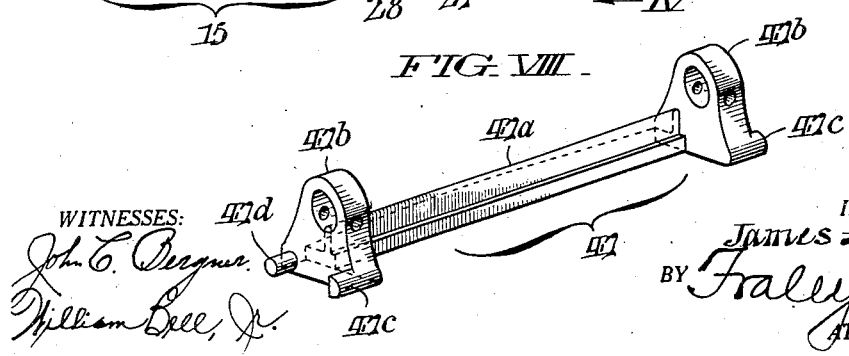
INVENTOR:
James H. Jensen,
BY
ATTORNEYS.

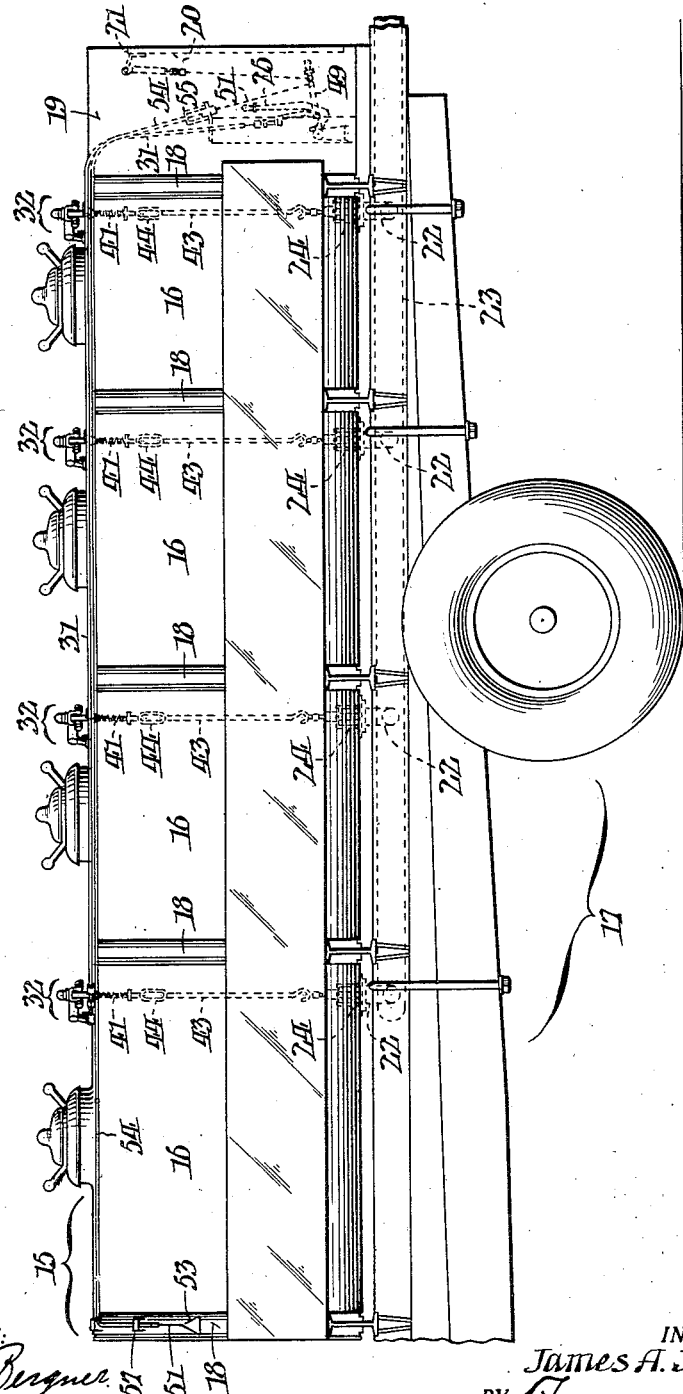

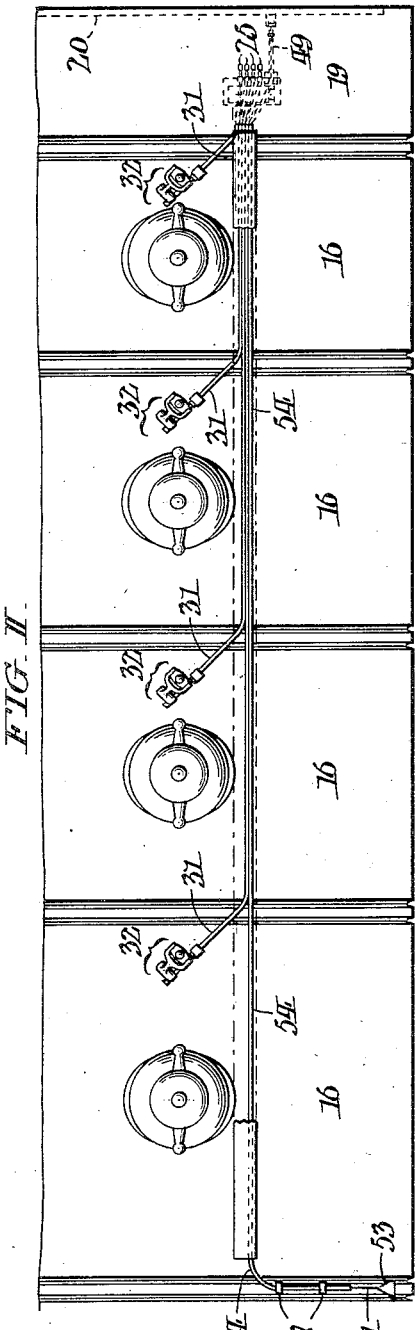
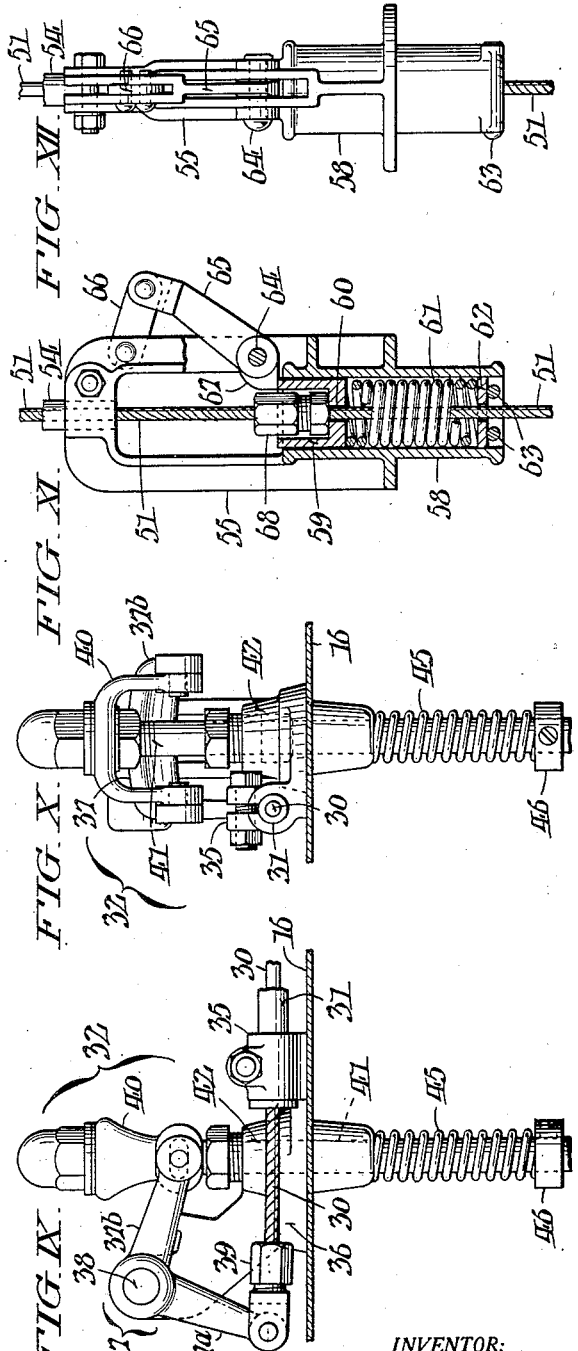

Oct. 31, 1933.  J. A. JENSEN  1,932,972
VALVE OPERATING MECHANISM FOR TANK VEHICLES
Filed April 12, 1933  5 Sheets-Sheet 4
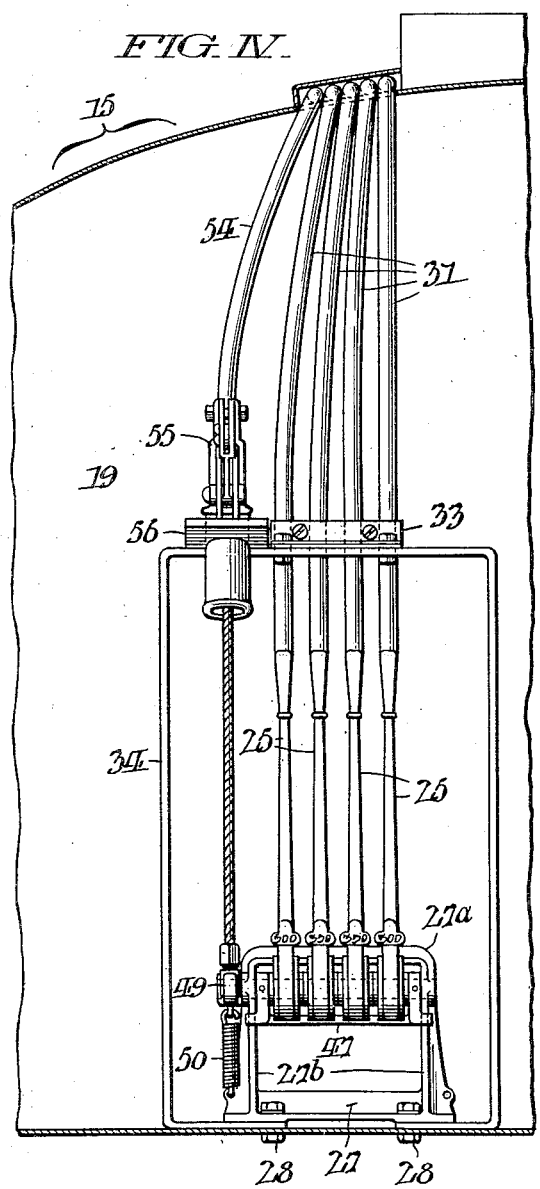
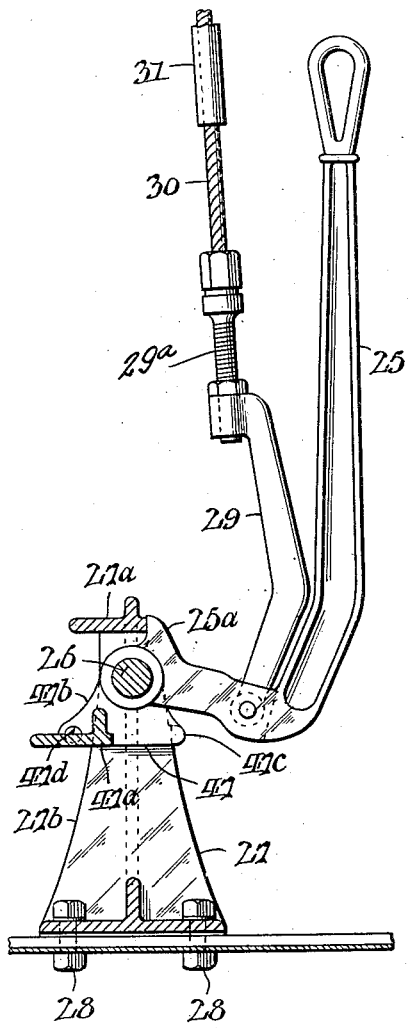
INVENTOR:
James H. Jensen,

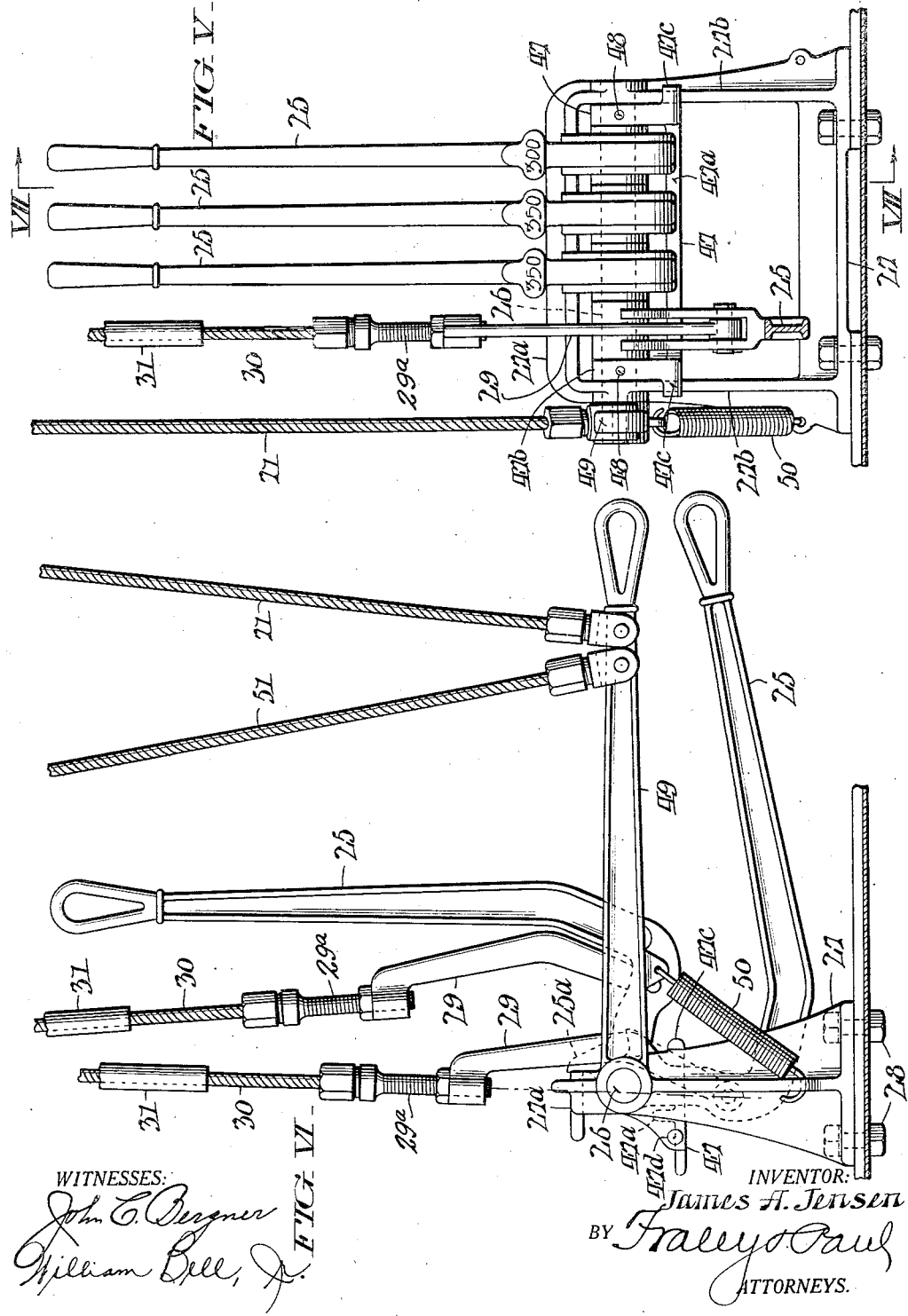

Patented Oct. 31, 1933

1,932,972

UNITED STATES PATENT OFFICE 1,932,972

VALVE OPERATING MECHANISM FOR TANK VEHICLES

James A. Jensen, Philadelphia, Pa., assignor to Quaker City Iron Works, Philadelphia, Pa., a corporation of Pennsylvania

REISSUED

Application April 12, 1933. Serial No. 665,642

18 Claims. (Cl. 221—67)

This invention relates to valve operating mechanism for tank vehicles such as are ordinarily employed in the delivery of gasoline, oils and other liquid commodities. More specifically, my invention has reference to valve operating mechanism for liquid product delivery vehicles wherein the tanks are subdivided into a number of compartments having individual valves to govern outlets in communication with a common drain pipe that extends rearward along the bottom of the tank, and moreover wherein there is a utility or can box at the rear of the vehicle.

Considered from the broadest aspect, my invention is directed toward the provision of simple and reliable mechanism with segregated controls at a point on the vehicle convenient of access to the driver—preferably in the utility box aforementioned—whereby the drain valves may be operated either individually or collectively as required incident to dispensing the liquid contents of the several compartments of the tank.

A further object of my invention is to provide in connection with tank valve operating mechanism characterized as above, auxiliary control means, whereby, in the event of fire at the delivery end of the drain pipe, the individual controls of any valves which may be open at the time, may be simultaneously actuated from a remote point on the vehicle, for example, at the front of the latter.

Another aim of my invention is to provide in association with the auxiliary control means above referred to, means capable, in the event of a fire originating at the rear of the vehicle and persisting in the absence of the driver, of automatically actuating the segregated controls in the utility box, to effect closure of any open drain valves.

Still another object of my invention is to insure against the drain valves being left open as a consequence of carelessness or forgetfulness on the part of the driver after making a delivery, through provision of means which will function automatically incident to shutting the door of the utility box, to trip the segregated controls of any open valves.

Other objects and attendant advantages of this invention will be manifest from the detailed description following of the attached drawings, wherein Fig. I is a partial side elevation of a tank vehicle embodying my improved valve operating mechanism.

Fig. II is a fragmentary view showing the top of the vehicle tank.

Fig. III is a fragmentary longitudinal section of the rear end of the tank drawn to a larger scale.

Fig. IV is a fragmentary cross sectional view taken as indicated by the arrows IV—IV in Fig. III showing in rear elevation the segregated controls of my valve operating mechanism.

Fig. V is a view like Fig. IV but more limited in scope, showing the rear elevation of the segregated control means on a larger scale.

Fig. VI shows the left hand side elevation of the control means.

Fig. VII is a sectional view taken as indicated by the arrows VII—VII in Fig. V.

Fig. VIII is a perspective view of a universal trip member forming a part of the control means.

Fig. IX is a left hand side elevation of the operating connections for the drain valves.

Fig. X is a rear elevation of the operating connection shown in Fig. IX.

Fig. XI is a sectional view of the safety fusible link means.

Fig. XII is a rear elevation of the safety fusible link means.

The vehicle tank chosen for the purposes of illustration herein, and comprehensively designated by the numeral 15 in the drawings, is composed of four serially-arranged separately-constructed unit compartments 16 of different capacities which are bound to each other and to the chassis 17 of the vehicle, after common practice in this art, by embracing straps 18. Similarly secured to the endmost tank compartment 16 at the rear of the vehicle 17, is a utility box 19 for the storage of utensils, tools, etc. used in dispensing the liquids carried by the vehicle, said box having a door 20 hinged at 21 to swing upward to open position as shown in Fig. III. The several tank compartments 16 are individually provided with bottom discharge outlets 22 which connect with a common drain pipe 23 extending longitudinally rearward of the bottom of the vehicle, see Fig. I. Discharge through the outlets 22 is governable by individual valves 24 which may be of any approved design and which open upward against the pressure of springs concealed within them.

The mechanism which I have devised for selectively operating the drain valves 24 of a vehicle tank structure such as above briefly described, includes a group of segregated controls having the form of lever handles 25 which correspond in number to the valves, and which are housed within the utility box 19 at the rear end of the vehicle. As shown in Figs. III, VI and VII, the control handles 25 are of angular configuration viewed from the side, and fulcrumed for independent swinging movement on a shaft 26 which is supported in a mounting 27 secured to the bottom of the box 19 by means of bolts 28, see also Figs. IV-VI. Pivotally connected at their lower ends to the individual control handles 25 in the vicinity of the bends in the latter, are kinked toggle links 29 (Figs. III, VI and VII) whereof the upper ends are in turn connected, with interposition of slack adjusting screw links 29A, to cables 30. These cables 30 pass through guide tubes 31 which extend upward in the compartment 19 and then longitudinally forward along the top of the tank 15 respectively to individual operating connections 32 for the valves 24 of the several tank compartments 16. From Figs. III and IV it will be noted that the guide tubes 31 are secured at their rear ends by a manifold clamp 33 supported on the top of an upright rectangular frame 34 surrounding the bracket 27, while their forward ends are individually secured as shown in Figs. I, II, IX and X to integral clamps 35 of the bearing brackets 36 of the operating connections 32, which latter are affixed to the tops of the respective tank sections 16.

Referring to Figs. IX and X, each of the operating connections 32 comprises a bell crank member 37 which is fulcrumed at 38 on the bracket 36. In each instance, the forward end of the cable 30 is connected, by means of a clevis fitting 39, to the downward extremity 37a of the bell crank member 37; while the yoked horizontal extremity 37b of said member has its ends pivotally connected to the ends of a lifting fork 40 at the top end of a stem 41 which extends down through a stuffing box 42 on the bracket 36 into the tank compartment 16. A hooked link 43 extending up from the valve 24 in each tank compartment is connected, with interposition of a turn buckle 44, to the bottom end of the stem 41; and a helical spring 45 surrounding said stem and pressing downward against a collar 46 thereon, serves to maintain the corresponding cable 30 under tension, and, at the same time, assists the concealed spring of the valve 24 to hold the latter closed. Normally, the control handles 25 are maintained in vertical position as shown in Figs. IV and VII through engagement of tooth-like lugs 25a on them with the top horizontal 27a of the mounting 27.

When any one of the control handles 25 is swung from the normal vertical position shown in Figs. I and V to the horizontal position of Fig. VI, a pull is induced in the corresponding cable 30 with resultant opening, through the intermediate elements already described, of the drain valve 24 in the corresponding tank compartment 16. After being swung downward as just explained, the control handle 25 is prevented from returning under the reverse pull of the spring 45 at the connection 32 as a consequence of movement of the pivot center of the toggle link 29 beyond the center of the rock shaft 26, thereby the valve 24 of the corresponding tank compartment is locked in open position to permit draining of such compartment. The downward swing of the control handle 25 is limited, as will be noted from Fig. VI, through engagement of said handle with the cross bar 47a of an element 47 which is illustrated in perspective in Fig. VIII, and, which, for reasons later on explained, serves as a trip member. As shown, this trip member 47 is formed at opposite ends of its cross bar 47a with drop hangers 47b which are apertured to engage the rock shaft 26 of the control handles 25 in the intervals between the bosses of the endmost of said handles and the sides 27a of the mounting 27, said hangers being secured to the rock shaft by pins 48, see Fig. V. Projecting laterally from the end hangers 47b of the trip member 47 are lugs 47c, 47d, which, by cooperation with the side verticals 27a of the mounting 27, permit a limited amount of rocking movement of the rock shaft 26.

To one end of the rock shaft 26 is pinned another lever handle 49, which is subject to the downward pull of a tension spring 50, and which is thus normally held in horizontal position as shown in Fig. III as a consequence of the enforced contact of the lugs 47c on the trip member 47 with the side verticals 27a of the mounting 27. By lifting the lever handle 49, anticlockwise movement will obviously be imparted to the rock shaft 26 and the trip member 47 attached to it, with attendant rearward displacement of the toggle links 29 of any of the control handles 25 which may have been depressed, and restoration of said handles to their normal upright positions by the cables 30 under the influence of the springs 45 of the connections 32. The drain valves 24 corresponding to the control handles 25 tripped as just explained are thus simultaneously released and permitted to close automatically under the action of their concealed springs.

In order to make it possible to close the drain valves 24 from the front of the vehicle in the event of a fire at the delivery end of the drain pipe 23, I have provided a supplemental control in the form of an additional cable 51 whereof the aft end is connected at 52 to the trip lever handle 49, and which is operable by means of a grasp 53 attached thereto at its forward end. As shown in Figs. I, II and III, the additional cable 51 is threaded through a guide tube 54 which extends upward in the compartment 19 from a special clamp 55 on a bracket projection 56 of the frame 34, and then forwardly along the top of the tank 17, with the guide tubes 31 for the cables 30, to fixed anchorages 57. Pulling of the grasp 53, will obviously result in lifting of the lever handle 49 in the compartment 19, and, in turn, in the simultaneous closure of any valves 24 which may be open at the time.

For further protection against fire hazards, I provide a safety means capable of functioning automatically in the presence of heat or flame to cause closure of any drain valves 24 which may be open at the time. This safety means comprises a cylinder 58 (Figs. III, XI and XII) which is formed integrally with the clamp bracket 55 in the box 19, and which serves as a guide for a piston-like plunger 59. As shown in Fig. XI, this plunger 59 is cup-shaped in cross section and pierced centrally at 60 for free passage or reeving of the cable 51 therethrough during normal operation of the latter. A helical spring 61 with its lower end abutting an axially-apertured disk 62 held by a pair of cross pins 63 in the bottom end of the cylinder 58, tends to urge the plunger 59 upward out of said cylinder. Fulcrumed at 64 to one side of the bracket 55 is an arm 65 which is normally held, by means of a fusible link 66, in the position illustrated in Fig. XI, with a lateral projection 67 thereof intercepting the plunger 59. Upon failure of the link 66 through fusion under the action of flame or heat, it is evident that the arm 65 will be left unrestrained whereby the plunger 59 is released to the action of the spring 61. In being thus released, the plunger 59 will spend its force upwardly against a clamp collar 68 on the cable 51, thereby causing the lever handle 49 to be lifted, and, in turn, causing any open drain valves 24 to be simultaneously closed through the intervening parts of the trip means.

As a safeguard against forgetfulness or negligence on the part of the driver to insure that the drain valves 24 are all closed before the vehicle gets under way after making a delivery, I couple the lever handle 49, as best shown in Fig. III, with a projecting anchorage 69 bolted to the door 20 of the compartment 19 adjacent the hinge 21, by means of a link connection 70 consisting of a cable section 71 and a tension spring 72. As the projecting anchorage 69 moves upward in the box 19 to the dot and dash line position in Fig. III as the door 20 is shut, the trip lever handle 49 is automatically lifted and any open drain valve 24 closed as a result. The spring 72 constitutes a means to prevent breakage or bending of the interacting parts of trip mechanism in case that the cable section 71 of the connection 70 is too short.

Having thus described my invention, I claim:

1. Valve operating mechanism for multi-compartment tanks having separate self-closing valves to govern discharge of liquids from the individual compartments, said mechanism comprising a segregated group of independently-operable controls in the form of lever handles, an element associated with each control handle to hold it set when swung to open the corresponding valve, connectors coordinating the holding elements individually with the valves, a trip member common to the holding elements, and means whereby the trip member may be actuated to simultaneously trip the holding elements of any control handles, pre-set as aforesaid, to release the corresponding valves.

2. Valve operating mechanism for multi-compartment tanks having separate self-closing valves to govern discharge of liquids from the individual compartments, said mechanism comprising a segregated group of independently-operable controls in the form of lever handles, an element associated with each control handle to hold it set when swung to open the corresponding valve; flexible connectors coordinating the holding elements individually with the valves, tubes for guiding the flexible connectors, a trip member common to the holding elements, and means whereby the trip member may be actuated to simultaneously trip the holding elements of any control handles pre-set as aforesaid to release the corresponding valves.

3. Valve operating mechanism for multi-compartment tanks having separate self-closing valves to govern discharge of liquid from the individual compartments, said mechanism comprising a segregated group of independently-operable controls in the form of lever handles, connectors coordinating the control handles individually with the drain valves, a toggle link associated with each control handle to hold it set when swung to open the corresponding valve, a trip member common to the toggle links; and means whereby the trip member may be actuated to simultaneously trip the toggle links of any control handles pre-set as aforesaid, to release the corresponding valves.

4. Valve operating mechanism for multi-compartment tanks having separate self-closing valves to govern discharge of liquids from the individual compartments, said mechanism comprising a segregated group of independently-operable controls in the form of lever handles, a shaft whereon said control handles are fulcrumed with capacity for independent actuation, connectors coordinating the control handles with the individual valves, a toggle link interposed in each connector and pivoted to each control handle to hold such handle set when swung to open the corresponding valve, a trip member common to the toggle links secured to the shaft, and means whereby said shaft may be rocked to actuate the trip member for simultaneous tripping of the toggles of any control handles pre-set as aforesaid to release the corresponding valves.

5. Valve operating mechanism for multi-compartment tanks of vehicles employed in the transport of fuel oils and the like and having separate self-closing valves to govern discharge of the liquids from the individual compartments, said mechanism comprising a segregated group of independently-operable controls in the form of lever handles convenient of access at a suitable point on the vehicle, connectors coordinating the control handles individually with the valves, an element associated with each control handle to hold it set when swung to open the corresponding valve, a trip member common to the holding element of the several control handles, and means local to said handles whereby the trip member may be actuated to simultaneously trip the toggle links of any handles pre-set as aforesaid to release the corresponding valves.

6. Valve operating mechanism for multi-compartment tanks of vehicles employed in the transport of fuel oils and the like, having separate self-closing valves to govern discharge of the liquids from the individual compartments, said valve mechanism comprising a segregated group of independently-operable controls in the form of lever handles convenient of access at a suitable point on the vehicle, connectors coordinating the control handles individually with the valves, an element associated with each of the control handles to hold it set when swung to open the corresponding valve, a trip member common to the holding elements of the several control handles, means local to the control handles whereby the trip member may be actuated to simultaneously trip the toggles of any of said handles, pre-set as aforesaid, to release the corresponding valves, and supplemental means whereby the trip member may be actuated at a point remote from the control handles.

7. Valve operating mechanism for multi-compartment tanks of vehicles employed in the transport of fuel oils and the like, and having separate self-closing valves to govern discharge of the liquids from the individual compartments, said mechanism comprising a segregated group of independently-operable controls in the form of lever handles convenient of access at a suitable point on the vehicle, connectors coordinating the control handles individually with the drain valves, an element associated with each control handle to hold it set when swung to open the corresponding valve, a trip member common to the holding elements of the several control handles, means whereby the trip member may be actuated to simultaneously trip the toggles of any control handles pre-set as aforesaid to release the corresponding valves, and supplemental means responsive to excessive heat or flame and operative to automatically actuate the trip member in the event of fire.

8. Valve operating mechanism for multi-compartment tanks of vehicles employed to transport fuel oils and the like and having separate self-closing valves to govern discharge of the liquids from the individual compartments into a common rearwardly extending drain pipe, said mechanism comprising a segregated group of independently operable controls in the form of lever handles convenient of access at the rear of the vehicle, connectors coordinating the control handles individually with the drain valves, an element associated with each control handle to hold it set when swung to open the corresponding valve, a trip member common to the holding elements of the several control handles, means local to the control handles whereby the trip member may be actuated to simultaneously trip the toggles of any control handles pre-set as aforesaid, to release the corresponding valves, and supplemental means likewise at the rear of the vehicle responsive to excessive heat or flame and operative automatically to actuate the trip member in the event of a fire at the delivery end of the drain pipe.

9. Valve operating mechanism for multi-compartment tanks of vehicles employed in the transport of fuel oils and the like, and having separate self-closing valves to govern discharge of the liquids from the individual compartments into a drain pipe extending to the rear end of the vehicle, said mechanism comprising a segregated group of independently-operable controls in the form of lever handles convenient of access in a utility compartment at the rear of the tank above the delivery end of the drain pipe, connectors extending from the control handles in the utility box to the individual drain valves, an element associated with each control handle to hold such handle set when swung to open the corresponding valve, a trip member common to the holding elements of the several control handles, means within the utility box whereby the trip member may be manually actuated to simultaneously trip the holding elements of any control handles pre-set as aforesaid to release the corresponding valves, and supplemental means likewise within the utility box responsive to excessive heat or flame and operative to automatically actuate the trip member in the event of fire at the delivery end of the drain pipe.

10. Valve operating mechanism for multi-compartment tanks of vehicles employed in the delivery of fuel oils and the like and having separate self-closing valves to govern discharge of liquids from the individual compartments, said mechanism comprising a segregated group of independently-operable controls in the form of lever handles located in a utility box at the rear end of the vehicle, a shaft whereon said control handles are fulcrumed with capacity for independent actuation, connectors coordinating the control handles with the individual valves, an element associated with each control handle to hold the latter set when swung to open the corresponding valve, a trip member secured to the shaft and having a cross bar common to the holding elements and means within the utility box whereby the shaft may manually be rocked to actuate the trip member and thereby effect simultaneous tripping of the holding members of any control handles pre-set as aforesaid to release the corresponding valve.

11. Valve operating mechanism for multi-compartment tanks of vehicles employed in the transport of fuel oils and the like and having separate self-closing valves to govern discharge of liquids from the individual compartments, said mechanism comprising a segregated group of independently-operable controls in the form of lever handles located in a utility box at the rear end of the vehicle, connectors coordinating the control handles with the individual valves, an element associated with each control handle to hold it set when swung to open the corresponding valve, a trip member common to the holding elements, means within the utility box whereby the trip member may be actuated to trip the holding members of any control handles pre-set as aforesaid, for release of the corresponding valves, and supplemental means whereby the trip member may be manually actuated from the front end of the vehicle.

12. Valve operating mechanism for multi-compartment tanks of vehicles employed in the transport of fuel oils and the like, and having separate self-closing valves to govern discharge of liquids from the individual compartments, said mechanism comprising a segregated group of independently-operable controls in the form of lever handles located within a utility box at the rear end of the vehicle, connectors coordinating the control handles with the individual valves, an element associated with each such control handle to hold the latter set when swung to open the corresponding valve, a trip member common to the holding elements of the several control handles, and means connecting the trip member to the door of the utility compartment whereby, as said door is closed, said trip member is automatically actuated to trip the holding elements of any handles pre-set as aforesaid, to release the corresponding valves.

13. Valve operating mechanism for multi-compartment tanks of vehicles employed in the transport of fuel oils and the like and having separate self-closing valves to govern discharge of liquid from the individual compartments, said mechanism comprising a segregated group of independently-operable controls in the form of lever handles, connectors coordinating the control handles with the individual valves, an element associated with each control handle to hold it set when swung to open the corresponding valve, a trip member common to the several holding elements, means whereby the trip member may be manually actuated to trip the holding elements of any control handles pre-set as aforesaid, to release the corresponding valves, means whereby the trip member may be manually actuated, and safety means for automatically actuating the trip member in the event of fire including a spring, and a fusible member adapted to melt under the action of excessive heat or of flame to release the spring for exertion of its force upon said trip means.

14. Valve operating mechanism for multi-compartment tanks of vehicles employed in the transport of fuel oils and the like and having separate self-closing valves to govern discharge of liquids from the individual compartments into a common drain pipe extending rearward of the vehicle, said mechanism comprising a segregated group of independently-operable controls in the form of lever handles located in a utility box at the rear end of the vehicle, connectors coordinating the control handles with the individual valves, a shaft on which said handles are fulcrumed with capacity for independent actuation, an element associated with each control handle to hold it set when swung to open the corresponding valve, a trip member secured to the shaft and having a bar common to the several holding elements, a separate lever secured to the shaft whereby the trip member may be manually actuated to trip the holding members of any control handles pre-set as aforesaid, to release the corresponding valves, a flexible connector extending from the trip handle in the utility box forward of the tank and constituting a supplemental means whereby the trip means may be actuated from the front end of the vehicle and safety means within the utility box automatically operative to actuate the trip lever in the event of fire including a collar on the flexible connector, a spring, and a fusible element adapted to melt under the action of excessive heat or of flame to release the spring for exertion of its force upon the collar of the flexible connector.

15. Valve operating mechanism for multi-compartment tanks having self-closing valves to govern discharge of liquid from the individual compartments, said mechanism comprising a segregated group of independently-operable controls in the form of lever handles, an element associated with each control handle to hold it set when swung to open the corresponding valve, flexible cable connectors coordinating the holding elements individually with the valves; slack take-up means interposed in the flexible connectors; a trip member common to the holding elements, and means whereby the trip member may be actuated to simultaneously trip the holding element of any control handles, pre-set as aforesaid, to release the corresponding valves.

16. Valve operating mechanism for multi-compartment tanks having separate self-closing valves to govern discharge of liquids from the individual compartments, said mechanism comprising a segregated group of independently-operable controls in the form of lever handles, an element associated with each control handle to set it when swung to open the corresponding valve, flexible cable connectors coordinating the holding elements individually with the valves, screw links interposed between the holding elements and the flexible cable connectors whereby the slack of the latter may be taken up, a trip member common to the holding elements and means whereby the trip member may be actuated to simultaneously trip the holding elements of any control handles, pre-set as aforesaid, to release the corresponding valves.

17. Valve operating mechanism for multi-compartment tanks having self-closing bottom valves with individual actuating means at the top of the tank to govern discharge of liquids from the individual compartments, said mechanism comprising a segregated group of independently-operable controls in the form of lever handles at the rear end of the tank, an element associated with each control handle to hold it set when swung to open the corresponding valve, flexible cable connectors coordinating the holding elements individually with the actuators at the top of the tank, means for guiding the movement of the cables, a trip member common to the holding elements, and means whereby the trip member may be actuated to simultaneously trip the holding elements of any control handles, pre-set as aforesaid, to release the corresponding valves.

18. Valve operating mechanism for multi-compartment tanks having separate self-closing bottom valves with individual actuating means at the top of the tank to govern discharge of liquids from the individual compartments, said mechanism comprising a segregated group of independently operable controls in the form of lever handles at the rear end of the tank, an element associated with each control handle to hold it set when swung to open the corresponding valve, flexible cable connectors coordinating the holding elements individually with the actuators at the top of the tank, fixed guide tubes for the connectors extending along the top of the tank and downwardly of its rear end to a point near the controls, a trip member common to the holding elements, and means whereby the trip member may be actuated to simultaneously trip the holding elements of any control handles, pre-set as aforesaid, to release the corresponding valves.

JAMES A. JENSEN.